United States Patent
Chang et al.

(10) Patent No.: US 10,969,853 B2
(45) Date of Patent: Apr. 6, 2021

(54) USB ADAPTING CIRCUIT

(71) Applicant: REALTEK SEMICONDUCTOR CORP., HsinChu (TW)

(72) Inventors: Cheng-Pin Chang, HsinChu (TW); Tsung-Peng Chuang, HsinChu (TW); Chun-Hao Peng, HsinChu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 2 days.

(21) Appl. No.: 16/574,675

(22) Filed: Sep. 18, 2019

(65) Prior Publication Data
US 2020/0201416 A1   Jun. 25, 2020

(30) Foreign Application Priority Data
Dec. 24, 2018   (TW) .................................. 107146863

(51) Int. Cl.
| *G06F 1/3215* | (2019.01) |
| *G06F 3/02* | (2006.01) |
| *G06F 13/40* | (2006.01) |
| *G06F 1/26* | (2006.01) |
| *G06F 13/42* | (2006.01) |

(52) U.S. Cl.
CPC ............ *G06F 1/3215* (2013.01); *G06F 1/266* (2013.01); *G06F 3/0227* (2013.01); *G06F 13/4072* (2013.01); *G06F 13/4282* (2013.01); *G06F 2213/0042* (2013.01)

(58) Field of Classification Search
CPC ...... G06F 1/3215; G06F 1/266; G06F 3/0227; G06F 13/4072; G06F 13/4282; G06F 2213/0042
See application file for complete search history.

(56) References Cited

U.S. PATENT DOCUMENTS

| 2002/0011516 | A1* | 1/2002 | Lee .......................... G06K 7/00 235/380 |
| 2002/0156949 | A1* | 10/2002 | Kubo ................... G06F 13/4282 710/72 |
| 2007/0260783 | A1* | 11/2007 | Combs .................... G06F 1/266 710/62 |
| 2011/0167287 | A1* | 7/2011 | Walsh ................... G06F 1/3209 713/323 |

(Continued)

FOREIGN PATENT DOCUMENTS

CN              1240019 C     2/2006

*Primary Examiner* — Glenn A. Auve
(74) *Attorney, Agent, or Firm* — Birch, Stewart, Kolasch & Birch, LLP

(57) ABSTRACT

A USB adapting circuit is suitable for being connected between a USB host and an external device. The USB adapting circuit includes a connecting port, a detecting circuit, a standby circuit and a main circuit. The standby circuit receives a power supply from the USB host and supplies the detecting circuit and the main circuit with the power supply. The detecting circuit is configured to output a connected signal when the external device is connected to the connecting port. The standby circuit outputs an enabling signal in response to the connected signal. The main circuit adapts between the USB host and the external device when receiving the enabling signal. Therefore, the main circuit does not work without receiving the enabling signal, and has a power saving effect.

12 Claims, 2 Drawing Sheets

(56) References Cited

U.S. PATENT DOCUMENTS

| | | | |
|---|---|---|---|
| 2011/0231682 A1* | 9/2011 | Kakish | G06F 1/3203 |
| | | | 713/320 |
| 2015/0253842 A1* | 9/2015 | Murata | G06F 1/3287 |
| | | | 713/323 |
| 2016/0099584 A1* | 4/2016 | Park | H02J 7/342 |
| | | | 320/106 |
| 2016/0141822 A1* | 5/2016 | Hijazi | H01R 13/6595 |
| | | | 361/679.31 |
| 2019/0286597 A1* | 9/2019 | Chiba | G06F 13/4022 |

* cited by examiner

USB ADAPTING CIRCUIT

CROSS-REFERENCE TO RELATED APPLICATION

This non-provisional application claims priority under 35 U.S.C. § 119(a) to Patent Application No. 107146863 in Taiwan, R.O.C. on Dec. 24, 2018, the entire contents of which are hereby incorporated by reference.

BACKGROUND

Technical Field

The present disclosure relates to a USB adapting circuit, and more particularly relates to an adapting circuit coupled between a USB host and an external device.

Related Art

A USB (Universal Serial Bus) interface has hot plugging and plug-and-play advantages. With the development of the technology, a USB 3.2 has a transmission rate of 20 Gbps (20 billion bits per second), three stages of voltage: 5 V, 12 V and 20 V, and a highest power of 100 W. Therefore, USBs are used more and more extensively. The USB is mainly applied as a connection between a USB host and a USB external device for providing a communication interface and/or power transmission therebetween.

A USB adapter is used to switch different USB versions, or to switch between a USB and other communication interfaces. During use, one end of the USB adapter is connected to the USB host, and the other end is connected to an external device. The USB adapter is capable of switching among different USB versions, switching between the USB and other communication interfaces, and/or power transmission. The USB host provides the USB adapter with a power for its operation.

SUMMARY

As mentioned above, a USB adapter uses the power of a USB host. When the USB adapter is connected with the USB host, and an external device is not connected with the USB adapter, the USB adapter is standby and consumes the power.

In view of the above, a USB adapting circuit includes a connector, a connecting port, a detecting circuit, a standby circuit and a main circuit. The detecting circuit is configured to detect a connection state of the connecting port, and output a connected signal when the connection state is connected. The standby circuit is configured to output a standby power to the detecting circuit when supplied with a power supply. The standby circuit outputs an enabling signal in response to the connected signal. The main circuit is configured to adapt between the connecting port and the connector when supplied with the power supply and receiving the enabling signal.

According to some embodiments, the detecting circuit stops outputting the connected signal when the connection state is not connected.

According to some embodiments, the main circuit includes a power management circuit and a USB adaption circuit. The power management circuit is configured to receive the power supply, and output a working power when receiving the enabling signal. The USB adaption circuit is configured to receive the working power and adapt between the connecting port and a USB host.

According to some embodiments, the USB adapting circuit further includes a power switch. The power switch is configured to receive a regulated power supply and a direct power supply of the USB host and alternatively supply the standby circuit and the main circuit with the regulated power supply or the direct power supply.

According to some embodiments, the main circuit controls, according to a message of the USB host, the power switch to supply the standby circuit and the main circuit with one of the regulated power supply and the direct power supply.

According to some embodiments, the USB adapting circuit includes a plurality of the connecting ports. The detecting circuit is configured to respectively detect connection states of the connecting ports, and output the connected signal when one of the connection states is connected. The main circuit is configured to adapt between the connected connecting port and the connector when supplied with the power supply and receiving the enabling signal.

In conclusion, according to some embodiments, the main circuit of the USB adapting circuit starts to work when the connection state is connected, and adapts between the USB host and the external device. The main circuit does not work if it does not receive the enabling signal, so that a power saving effect is achieved.

DETAILED DESCRIPTION

Figure 1:
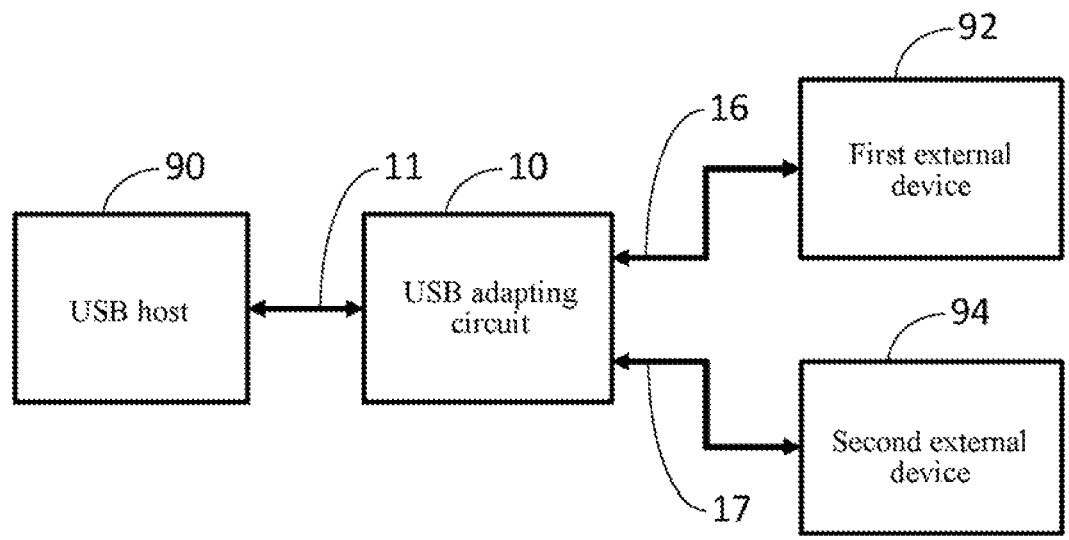
FIG. 1 illustrates a function block diagram of a USB adapting circuit and application thereof according to some embodiments.

Referring to FIG. 1, it is a function block diagram of a USB adapting circuit and application thereof according to some embodiments. A USB adapting circuit 10 is suitable for being connected between a USB host 90 and at least one external device. According to embodiments of FIG. 1, the USB adapting circuit 10 is connected to two external devices (including a first external device 92 and a second external device 94). According to an application example of FIG. 2, a USB adapting circuit 10a is connected to an external device 92. The USB adapting circuit 10 may be arranged in a USB adapter or an external device.

The USB host may be, but not limited to, a personal computer, a mobile device, photographic equipment, a digital television (such as a set top box), a game machine and the like.

The external devices 92 and 94 may be, but not limited to, an audio device, a USB communications and CDC control device (such as a network card, a modem and a serial port), a human interface device (such as a keyboard and a mouse), a physical interface device (such as a control rod), a still imaging device (such as an image scanner), a printing device (a printer), a mass storage (such as a flash drive, a mobile hard disk, a memory card and a digital camera), a USB hub, a communication device (a CDC-date, such as a modem and a fax machine), a smart card (such as a card reader), a video device (such as a network camera), an audio/video (AV) interface (such as a television), or a wireless transmission device (wireless controller, such as Bluetooth) and the like.

Referring to FIG. 1 again, one end of the USB adapting circuit 10 has a USB connector 11, and the other end has at least one connecting port 16, 17. The USB connector 11 is connected to the USB host 90, and the connecting ports 16, 17 are connected to the external devices 92, 94. The version of the USB connector 11 corresponds to the USB host 90, and the connecting ports 16, 17 correspond to the connector types of the external devices 92, 94. The connector types of the external devices 92, 94 may be, but not limited to, each USB versions, an audio jack plug, a video connector (such as an HDMI or RS485) and the like. In some embodiments, the USB adapting circuit 10 is configured to adapt a USB interface to other communication interfaces. In some embodiments, the USB adapting circuit 10 is configured to expand the USB interface (a single USB interface is expanded to a plurality of USB connecting ports). In some embodiments, the USB adapting circuit 10 is configured to adapt the USB interface to other communication interfaces and expand the USB interface.

Figure 2:
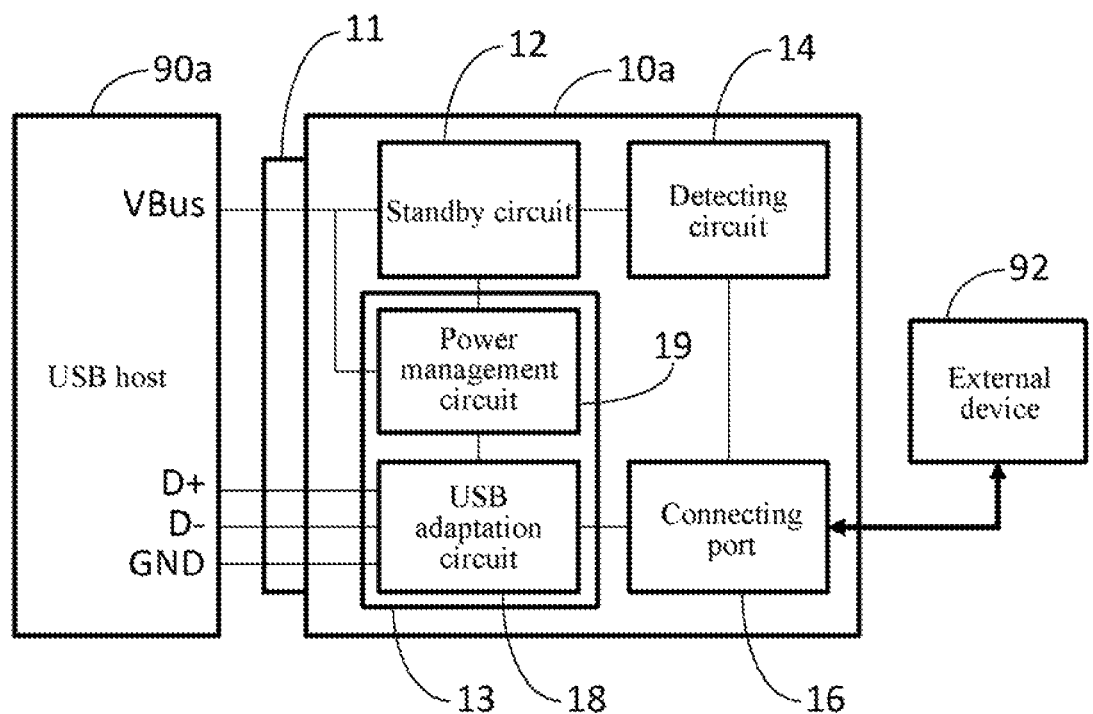
FIG. 2 illustrates a function block diagram of a USB adapting circuit and application thereof according to some embodiments.

Referring to FIG. 2, it is a function block diagram of a USB adapting circuit and application thereof according to some embodiments. The USB adapting circuit 10a includes a connector 11, a connecting port 16, a detecting circuit 14, a standby circuit 12 and a main circuit 13.

The detecting circuit 14 is configured to detect a connection state of the connecting port 16, and output a connected signal when the connection state is connected. The standby circuit 12 is configured to output a standby power to the detecting circuit 14 when supplied with a power supply. The standby circuit 12 outputs an enabling signal in response to the connected signal. The main circuit 13 is configured to adapt between the connecting port 16 and the connector 11 when supplied with the power supply and receiving the enabling signal.

The connector 11 is a USB connector matched with a USB host 90a. When the USB host 90a is connected with the connector 11, the USB host 90a and the USB adapting circuit 10a form an electrical connection. In the embodiment of FIG. 2, there are four electrical connections between the USB host 90a and the USB adapting circuit 10a. According to a definition of the USB version in FIG. 2, the four electrical connections include VBus (power supply), D+, D− and GND (ground). Therefore, the USB host 90a supplies the standby circuit 12 and the main circuit 13 with a power supply when the USB host 90a is connected with the connector 11. The standby circuit 12 outputs a standby power to the detecting circuit 14 when receiving the power supply. That is, when the connector 11 is connected to the USB host 90a, the standby circuit 12 and the detecting circuit 14 are powered.

The detecting circuit 14 detects the connection state of the connecting port 16 when powered. When the connecting port 16 is connected to the external device 92, the detecting circuit 14 acquires a connected state and outputs a connected signal. On the contrary, when the connecting port 16 is not connected to the eternal device 92, the detecting circuit 14 may not output the connected signal. In some embodiments, the connected signal is a high-level signal or low-level signal, so the 'output the connected signal' refers to providing the high-level signal or low-level signal, and the 'not output the connected signal' refers to providing the 'high-level signal or low-level signal' in an opposite phase.

The standby circuit 12 outputs the enabling signal to the main circuit 13 in response to the connected signal. The main circuit 13 adapts between the connecting port 16 and the connector 11 when receiving the power supply and the enabling signal. The adapting may include supplying a power to the external device 92, adapting communication interfaces between the external device 92 and the USB host 90a, enabling the USB host 90a to perform operations such as enumeration of the external device 92, and any combination thereof.

The main circuit 13 does not work and only consumes minimum power in a standby state when receiving the power supply but not receiving the enabling signal (namely when not enabled). Therefore, when the USB adapting circuit 10a is connected with the USB host 90a, and the external device 92 is not connected to the connecting port 16, only the standby circuit 12 and the detecting circuit 14 work, and the main circuit 13 does not work, thus effectively reducing the power consumption of the USB adapting circuit 10a. When the external device 92 is connected to the connecting port 16, the main circuit 13 starts to work to enable the external device 92 to be enumerated by the USB host 90a and communicate with the USB host 90a or do other work.

The way of detecting the connection state of the connecting port 16 by the detecting circuit 14 is determined by the external device 92. In some embodiments, the external device 92 is an earphone (audio device), and the connecting port 16 is an audio jack. When a plug of the earphone is connected to the audio jack, the detecting circuit 14 may detect that a voltage level of a certain connection point is grounded or set to be a high level, and at the moment, the detecting circuit 14 acquires the connection state indicating that the connecting port 16 is 'connected'. In some embodiments, the external device 92 is a video device (such as HDMI), and the detecting circuit 14 acquires the connection state of the connecting port 16 by judging whether a signal of one or some connection pins of the connecting port 16 exists or not.

The standby circuit 12 outputs the enabling signal to the main circuit 13 in response to the connected signal, which means that the standby circuit 12 continuously outputs the enabling signal when the connected signal exists, and the standby circuit 12 does not output the enabling signal when the connected signal does not exists (the connection state is changed into a non-connected state). In some embodiments, the standby circuit 12 is a logic circuit.

In some embodiments, the main circuit 13 includes a power management circuit 19 and a USB adaptation circuit 18. The power management circuit 19 is configured to receive the power supply, and output a working power when receiving the enabling signal. The USB adaptation circuit 18 is configured to receive the working power, and adapts between the connecting port 16 and the USB host 90a.

The power management circuit 19 processes the power supply from the USB host 90a when receiving the enabling signal. The processing executed by the power management circuit 19 on the power is determined by the USB adaptation circuit 18 and the external device 92, and may be, but not limited to, voltage stabilization, voltage reduction, and/or boosting and the like. The power management circuit 19 outputs the processed power as the working power, and the working power is supplied to the USB adaptation circuit 18.

Figure 3:
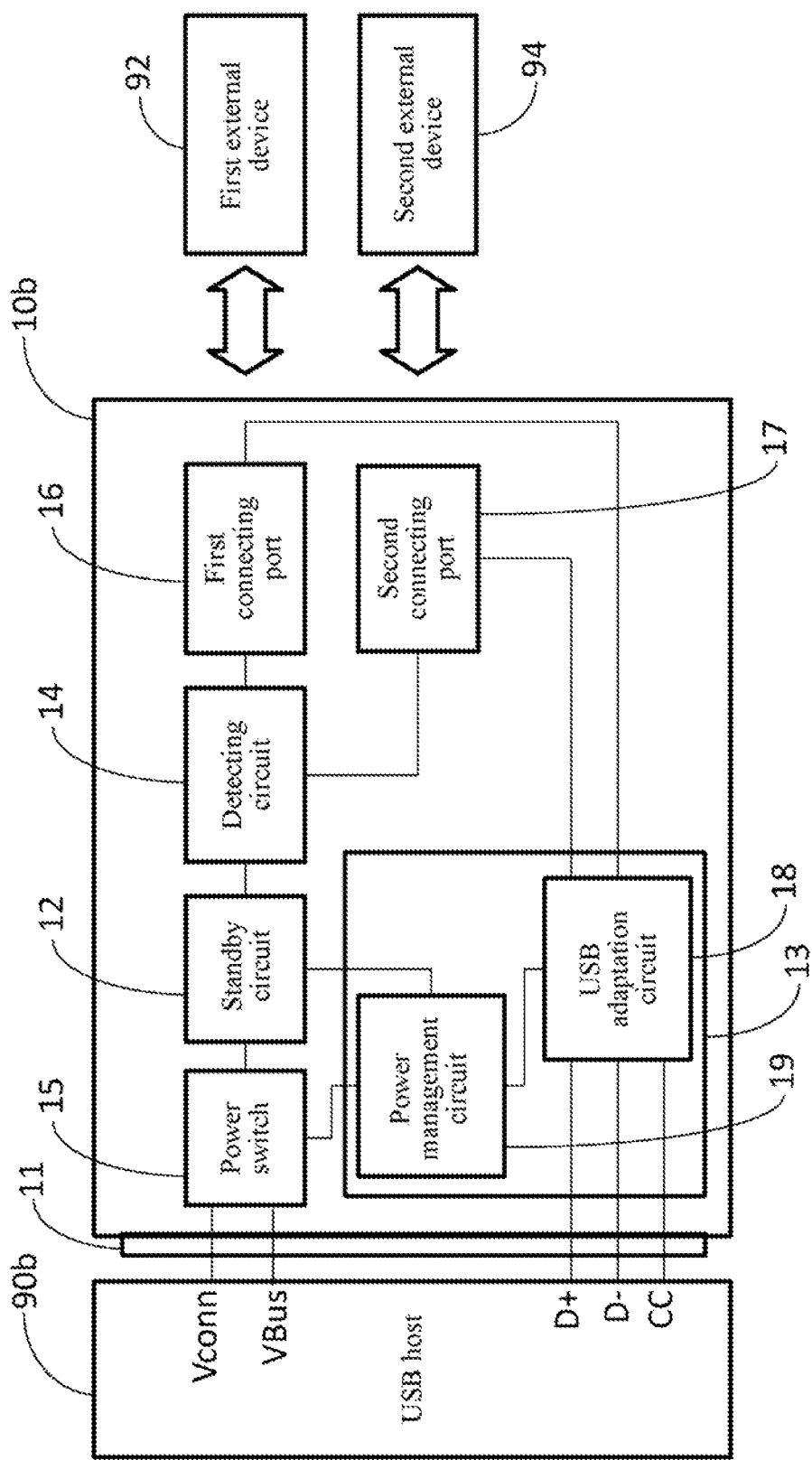
FIG. 3 illustrates a function block diagram of a USB adapting circuit and application thereof according to some embodiments.

In some embodiments, the USB adapting circuits 10, 10b are suitable for being connected to a plurality of external devices 92, 94. As shown in FIG. 1 or 3, the USB adapting circuit 10b includes a plurality of connecting ports 16, 17. The detecting circuit 14 is configured to respectively detect connection states of these connecting ports 16, 17 and output the connected signal when one of the connection states is connected. Therefore, when the USB adapting circuits 10 and 10b are connected to no external devices 92, 94, the main circuit 13 is in a standby state, and only elements related to the enabling signal work. When one of the plurality of external devices 92 and 94 is connected to the USB adapting circuit 10, 10b, the detecting circuit 14 acquires the 'connected' state and enables the main circuit 13 to work normally, and the main circuit 13 adapts between the external devices 92, 94 and a USB host 90b.

Continuously referring to FIG. 3, it is a function block diagram of a USB adapting circuit and application thereof according to some embodiments. The USB adapting circuit 10b includes a connector 11, a standby circuit 12, a main circuit 13, a detecting circuit 14, a power switch 15, a first connecting port 16 and a second connecting port 17.

The connector 11 is configured to connect a USB host 90b. In the embodiment of FIG. 3, five electrical connections are formed by connection between the connector 11 and the USB host 90b. According to a definition of the USB version, these electrical connections include a direct power supply (Vconn, Vconn Power), a regulated power supply (VBus, Vbus Power), D+, D− and CC (Configuration Channel). The direct power supply Vconn refers to a power supply directly supplied from a battery of the USB host 90b. The regulated power supply VBus refers to a power different from the power of the battery and supplied by the USB host 90b, such as a power output by a power module of the USB host 90b.

The power switch 15 is configured to receive the regulated power supply and the direct power supply of the USB host 90b and selectively supply the regulated power supply or the direct power supply to the standby circuit 12 and the main circuit 13. The standby circuit 12 is configured to output a standby power to the detecting circuit 14 when supplied with the power supply. The detecting circuit 14 is configured to detect connection states of the first connecting port 16 and the second connecting port 17, and output a connected signal when one of the connection states is 'connected'. The standby circuit 12 outputs an enabling signal in response to the connected signal. The main circuit 13 is configured to adapt between the connected connecting port 16 and the connector 11 when supplied with the power and receiving the enabling signal. Specifically, the main circuit 13 adapts between the connected external devices 92, 94 and the USB host 90b. The detecting circuit 14 does not output the 'connected signal' when detecting that all the connecting ports are 'non-connected'. The main circuit 13 is in the standby state, and only elements related to the 'enabling' work, so as to reduce the consumption of electric energy.

In some embodiments, the main circuit 13 includes a power management circuit 19 and a USB adaptation circuit 18. The power management circuit 19 is configured to receive the power supply, and output a working power when receiving the enabling signal. The USB adaption circuit 18 is configured to receive the working power and adapts between the connecting port 16 and the USB host 90a. In the embodiment of FIG. 3, the USB adaptation circuit 18 confirms whether the USB connecting device is able to use the direct power supply or not according to the configuration channel and the USB host 90b. The USB adaptation circuit 18 of the main circuit 13 controls the power switch 15 to supply one of the regulated power supply and the direct power supply to the standby circuit 12 and the main circuit 13 according to a message replied by the USB host 90b. In some embodiments, the main circuit 13 controls the power switch 15 to supply the regulated power supply to the standby circuit 12 and the main circuit 13. In some embodiments, the main circuit 13 controls the power switch 15 to supply the direct power supply to the standby circuit 12 and the main circuit 13.

Therefore, in the embodiment of FIG. 3, when the USB adapting circuit 10b is connected to the USB host 90b, but the external devices 92 and 94 are not connected with the USB adapting circuit 10b, only the power switch 15, the standby circuit 12 and the detecting circuit 14 in the USB adapting circuit 10b work. When one of the external devices 92, 94 is connected to the USB adapting circuit 10b, the main circuit 13 in the USB adapting circuit 10b works. Therefore, the consumption of the electric energy is obviously reduced after the USB adapting circuit 10b is connected with the USB host 90b.

In some embodiments, the detecting circuit 14 may include a first detecting circuit and a second detecting circuit (not shown in the figures). The first detecting circuit corresponds to the first connecting port 16, and the second detecting circuit corresponds to the second connecting port 17.

In conclusion, according to some embodiments, the main circuits 13 of the USB adapting circuits start to work when the connection state is connected, and adapt between the USB hosts 90, 90a, 90b and the external devices 92, 94. The main circuits 13 do not work without receiving the enabling signal and have a power saving effect.

What is claimed is:

1. A USB (Universal Serial Bus) adapting circuit, comprising:
   a connector;
   a connecting port;
   a detecting circuit, configured to detect a connection state of the connecting port, and output a connected signal when the connection state is connected;
   a standby circuit, configured to output a standby power to the detecting circuit when supplied with a power supply, the standby circuit outputting an enabling signal in response to the connected signal; and
   a main circuit, configured to adapt between the connecting port and the connector when supplied with the power supply and receiving the enabling signal.

2. The USB adapting circuit according to claim 1, wherein the detecting circuit stops outputting the connected signal when the connection state is not connected.

3. The USB adapting circuit according to claim 2, wherein the main circuit comprises:
   a power management circuit, configured to receive the power supply, and output a working power when receiving the enabling signal; and
   a USB adaption circuit, configured to receive the working power and adapt between the connecting port and a USB host.

4. The USB adapting circuit according to claim 3, further comprising a power switch, wherein the power switch is configured to receive a regulated power supply and a direct power supply of the USB host and alternatively supply the standby circuit and the main circuit with the regulated power supply or the direct power supply.

5. The USB adapting circuit according to claim 4, wherein the main circuit controls the power switch to supply the standby circuit and the main circuit with one of the regulated power supply and the direct power supply according to a message of the USB host.

6. The USB adapting circuit according to claim 5, wherein the USB adapting circuit comprises a plurality of connecting ports; the detecting circuit is configured to respectively detect connection states of the connecting ports, and output the connected signal when one of the connection states is connected; and the main circuit is configured to adapt between the connected connecting port and the connector when supplied with the power supply and receiving the enabling signal.

7. The USB adapting circuit according to claim 2, further comprising a power switch, wherein the power switch is configured to receive a regulated power supply and a direct power supply of a USB host and alternatively supply the standby circuit and the main circuit with the regulated power supply or the direct power supply.

8. The USB adapting circuit according to claim 7, wherein the main circuit controls the power switch to supply the standby circuit and the main circuit with one of the regulated power supply and the direct power supply according to a message of the USB host.

9. The USB adapting circuit according to claim 8, wherein the USB adapting circuit comprises a plurality of connecting ports; the detecting circuit is configured to respectively detect connection states of the connecting ports, and output the connected signal when one of the connection states is connected; and the main circuit is configured to adapt between the connected connecting port and the connector when supplied with the power supply and receiving the enabling signal.

10. The USB adapting circuit according to claim 1, further comprising a power switch, wherein the power switch is configured to receive a regulated power supply and a direct power supply of a USB host and alternatively supply the standby circuit and the main circuit with the regulated power supply or the direct power supply.

11. The USB adapting circuit according to claim 10, wherein the main circuit controls the power switch to supply the standby circuit and the main circuit with one of the regulated power supply and the direct power supply according to a message of the USB host.

12. The USB adapting circuit according to claim 11, wherein the USB adapting circuit comprises a plurality of connecting ports; the detecting circuit is configured to respectively detect connection states of the connecting ports, and output the connected signal when one of the connection states is connected; and the main circuit is configured to adapt between the connected connecting port and the connector when supplied with the power supply and receiving the enabling signal.

\* \* \* \* \*